US011982423B2

(12) United States Patent
Lu et al.

(10) Patent No.: US 11,982,423 B2
(45) Date of Patent: May 14, 2024

(54) TRACK LIGHTING DEVICE

(71) Applicant: Xiamen PVTECH Co., Ltd., Fujian (CN)

(72) Inventors: Fuxing Lu, Fujian (CN); Sishan Liao, Fujian (CN)

(73) Assignee: Xiamen PVTECH Co., Ltd., Fujian (CN)

( * ) Notice: Subject to any disclaimer, the term of this patent is extended or adjusted under 35 U.S.C. 154(b) by 0 days.

(21) Appl. No.: 17/927,695

(22) PCT Filed: Oct. 15, 2020

(86) PCT No.: PCT/CN2020/121075

§ 371 (c)(1),
(2) Date: Nov. 24, 2022

(87) PCT Pub. No.: WO2022/027824

PCT Pub. Date: Feb. 10, 2022

(65) Prior Publication Data

US 2023/0220961 A1 Jul. 13, 2023

(30) Foreign Application Priority Data

Aug. 4, 2020 (CN) ......................... 202010771280.1

(51) Int. Cl.
*F21S 8/06* (2006.01)
*F21S 4/20* (2016.01)
(Continued)

(52) U.S. Cl.
CPC .............. *F21S 8/066* (2013.01); *F21V 17/18* (2013.01); *F21V 21/112* (2013.01); *F21S 4/20* (2016.01);
(Continued)

(58) Field of Classification Search
CPC .... F21V 17/16; F21V 17/164; F21V 19/0035; F21V 19/004
See application file for complete search history.

(56) References Cited

U.S. PATENT DOCUMENTS 7,909,487 B1 * 3/2011 Venetucci .............. F21V 21/04 362/147
10,585,229 B1 3/2020 Lax
2009/0135608 A1 * 5/2009 Sell .................... F21V 19/0055 362/365

FOREIGN PATENT DOCUMENTS

CN 201651991 U 11/2010
CN 201875506 U 6/2011
(Continued)

OTHER PUBLICATIONS

Machine translation of EP 2827053 A1 retrieved from the FIT database of PE2E search. (Year: 2023).*

*Primary Examiner* — Colin J Cattanach
(74) *Attorney, Agent, or Firm* — Winston Hsu

(57) ABSTRACT

A track lighting is provided, which mainly includes a track structure and a light source installation base. The track structure includes an installation base, a first lateral wall and a second lateral wall circuitously extending from the two sides of the installation base respectively. The first locking portion at one end of the first lateral wall is engaged with the first buckle portion of the light source installation base, and the second locking portion at one end of the second lateral wall is engaged with the second buckle portion of the light source installation base. Besides, after the stopper structure of the light source installation base is inserted into the stopper space between the stopper element and the corresponding stopper portion of the second lateral wall, the stopper element and the corresponding stopper portion are at the two sides of the stopper structure.

2 Claims, 5 Drawing Sheets

(51) Int. Cl.

| | |
|---|---|
| ***F21S 4/28*** | (2016.01) |
| ***F21V 17/16*** | (2006.01) |
| ***F21V 17/18*** | (2006.01) |
| ***F21V 19/00*** | (2006.01) |
| ***F21V 21/04*** | (2006.01) |
| ***F21V 21/112*** | (2006.01) |
| ***F21V 21/34*** | (2006.01) |

(52) U.S. Cl.
CPC ................. *F21S 4/28* (2016.01); *F21V 17/16* (2013.01); *F21V 19/004* (2013.01); *F21V 21/04* (2013.01); *F21V 21/34* (2013.01)

(56) References Cited

FOREIGN PATENT DOCUMENTS

| | | | | | |
|---|---|---|---|---|---|
| CN | 103398351 | A | | 11/2013 | |
| CN | 206645684 | U | | 11/2017 | |
| CN | 107559676 | A | | 1/2018 | |
| CN | 207455259 | U | | 6/2018 | |
| CN | 108826114 | A | | 11/2018 | |
| CN | 110027973 | A | | 7/2019 | |
| EP | 2827053 | A1 | * | 1/2015 | ................ F21S 4/28 |
| JP | 2019-87310 | A | | 6/2019 | |

* cited by examiner

TRACK LIGHTING DEVICE

BACKGROUND OF THE INVENTION

1. Field of the Invention

The present invention relates to a track lighting, in particular to a track lighting with anti-drop structure.

2. Description of the Prior Art

The main structure of a currently available track lighting includes a track structure and a light source installation base. When the light source installation base is installed on the track structure, the light source installation base and the track structure are fixed with each other by only the locking and buckle structures capable of being engaged with each other. When the locking and buckle structures are old, the locking and buckle structures may not be stably engaged with each other. Besides, the user may not accurately install the track lighting, so the lighting source installation base may drop off the ceiling because the locking and buckle structures are not stably engaged with each other, which may damage the people passing through the corridor under the track lighting.

Therefore, it has become an important issue to develop a track lighting so as to solve the above problems.

SUMMARY OF THE INVENTION

To achieve the foregoing objective, the present invention provides a track lighting, which includes: a track structure comprising an installation base, a first lateral wall circuitously extending from one side of the installation base and a second lateral wall circuitously extending from the other side of the installation base, wherein one end of the first lateral wall is provided with a first locking portion and one end of the second lateral wall is provided with a second locking portion, wherein there is a stopper element adjacent to the installation base and extending in the direction toward the second locking portion, and the second lateral wall is provided with a stopper portion and corresponding to the stopper element, wherein a stopper space is formed between the stopper element and the stopper portion;

A lighting source installation base including a first buckle portion and a second buckle portion disposed at the two sides thereof respectively, wherein the first buckle portion is engaged with the first locking portion and the second buckle portion is engaged with the second locking portion, wherein a stopper structure extends from the position adjacent to the second buckle portion and is inserted into the stopper space, and the stopper structure includes a first aligning portion corresponding to the stopper element and a second aligning portion corresponding to the stopper portion, wherein a hanging groove is formed between the first aligning portion and the second aligning portion; and A hanging structure extending from the second lateral wall to the second locking portion and engaged with the hanging groove, wherein the hanging structure comprises an extending wall extending from the second lateral wall in the horizontal direction and a hanging wall extending from the extending wall in the direction toward the stopper element.

In one embodiment of the present invention, the distal end of the stopper element is provided with a bending portion.

In one embodiment of the present invention, the first aligning portion further includes a stopping portion corresponding to the bending portion.

In one embodiment of the present invention, the first aligning portion further includes a stopping portion corresponding to the bending portion.

In one embodiment of the present invention, the track lighting further includes a light source module installed on the light source installation base.

In one embodiment of the present invention,

To sum up, the track lighting according to the embodiments of the present invention may have the following technical feature: when the first locking portion is separated from the first buckle portion or the second locking portion is separated from the second buckle portion, the combination of the stopper element or the stopper portion and the stopper structure can effectively avoid that the track structure drops off the light source installation base so as to prevent form danger.

These and other objectives of the present invention will no doubt become obvious to those of ordinary skill in the art after reading the following detailed description of the preferred embodiment that is illustrated in the various figures and drawings.

DESCRIPTION OF REFERENCE NUMERALS

Figure 1:
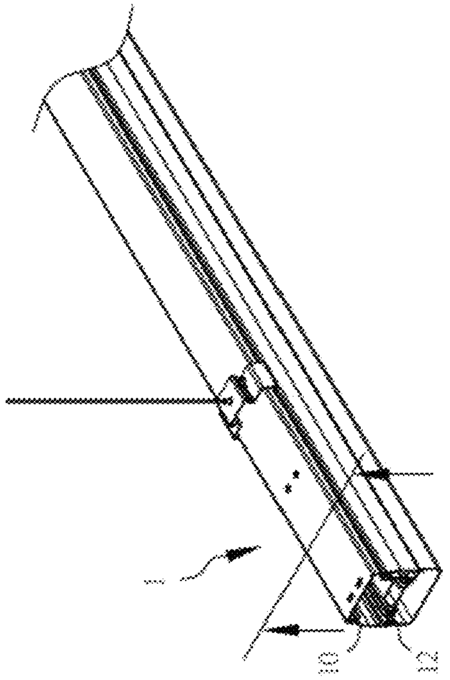
FIG. 1 is a 3-dimensional schematic view illustrating a structure of a track lighting in accordance with the present invention.

Track lighting 1, track structure 10, installation base 100, first lateral wall 191, first locking portion 1010, second lateral wall 102, second locking portion 1020, hanging structure 1021, extending wall 1021*a*, hanging wall 1021*b*, stopper element 1022, stopper portion 1024, stopper space 1026, bending portion 1028, light source installation base 12, first buckle portion 120, second buckle portion 122, stopper structure 124, first aligning portion 1240, second aligning portion 1242, hanging groove 1244, stopping portion 1246, light source module 14.

DETAILED DESCRIPTION

The technical content of the present invention will become apparent by the detailed description of the following embodiments and the illustration of related drawings as follows.

Figure 2:
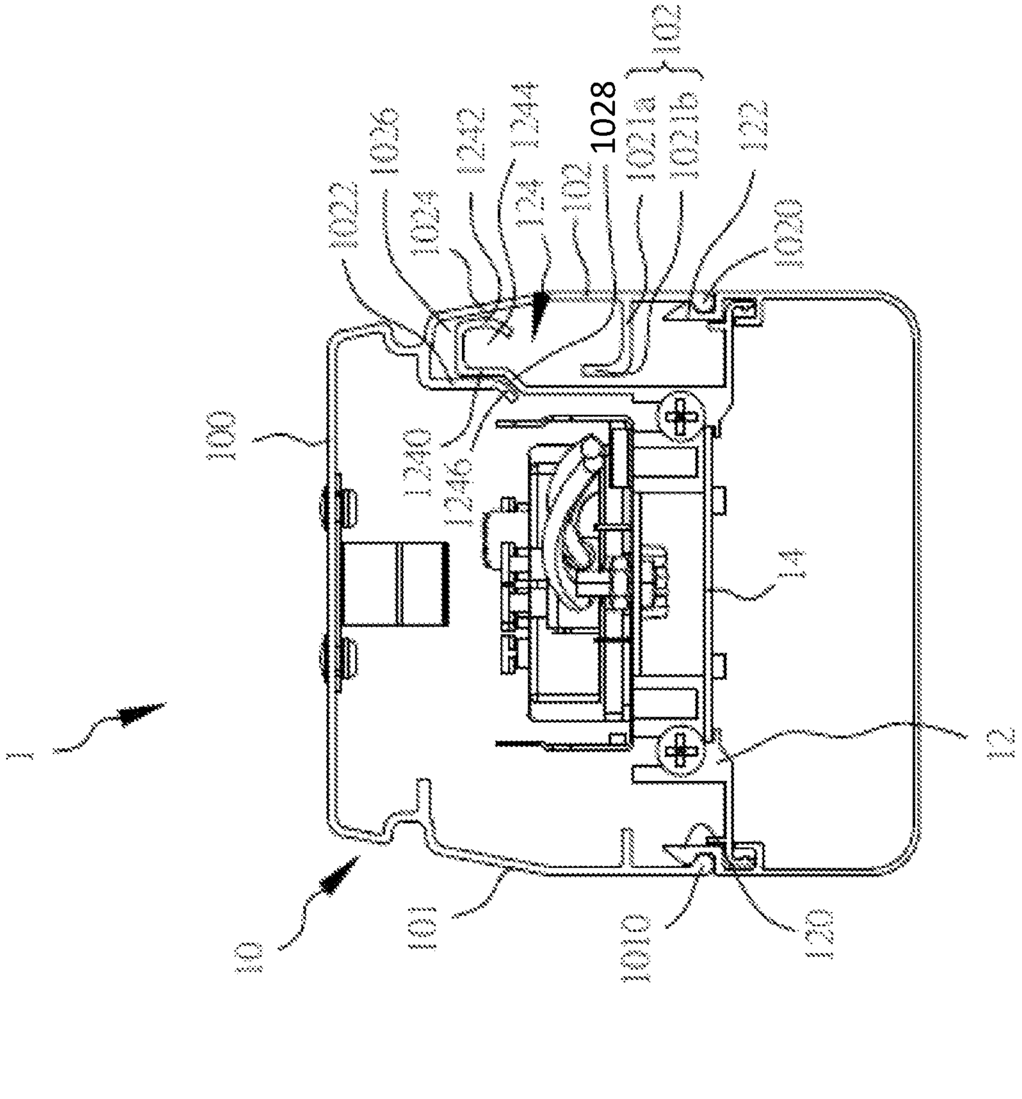
FIG. 2 is an A-A sectional view illustrating the structure of the track lighting of FIG. 1.

Please refer to FIG. 1 and FIG. 2, which are a 3-dimensional schematic view illustrating a structure of a track lighting in accordance with the present invention and a A-A sectional view illustrating the structure of the track lighting of FIG. 1. The present invention provides a track lighting 1, which mainly includes a track structure 10 and a light source installation base 12. The track structure 10 includes an installation base 100, a first lateral wall 101 circuitously extending from one side of the installation base 100 and a second lateral wall 102 circuitously extending from the other side of the installation base 100. One end of the first lateral wall 101 is provided with a first locking portion 1010 and one end of the second lateral wall 102 is provided with a second locking portion 1020. There is a stopper element 1022 adjacent to the installation base 100 and extending in the direction toward the second locking portion 1020. The second lateral wall 102 is provided with a stopper portion 1024 and corresponding to the stopper element 1022. A stopper space 1026 is formed between the stopper element 1022 and the stopper portion 1024.

Alighting source installation base 12 includes a first buckle portion 120 and a second buckle portion 122 disposed at the two sides thereof respectively. The first buckle portion 120 is engaged with the first locking portion 1010 and the second buckle portion 122 is engaged with the second locking portion 1020. A stopper structure 124 extends from the position adjacent to the second buckle portion 122 and is inserted into the stopper space 1026. The stopper structure 124 at least includes a first aligning portion 1240 corresponding to the stopper element 1022 and a second aligning portion 1242 corresponding to the stopper portion 1024.

The distal end of the stopper element 1022 is provided with a bending portion 1028. The first aligning portion 1240 further includes a stopping portion 1246 corresponding to the bending portion 1028. The bending portion 1028 and the stopping portion 1246 can provide the guiding effect to make the stopper structure 124 be limited in the stopper space 1026. In addition, the above design can prevent from the problem that the above structure is damaged due to single-point contact.

The track lighting 1 further includes a light source module 14. The light source module 14 is installed on the light source installation base 12.

A hanging groove 1244 is formed between the first aligning portion 1240 and the second aligning portion 1242. A hanging structure 1021 extends from the second lateral wall 102 to the second locking portion 1020 and is engaged with the hanging groove 1244. The hanging structure 1021 includes: an extending wall **1021*a* extending from the second lateral wall 102 in the horizontal direction and a hanging wall 1021*b* extending from the extending wall 1021*a* in the direction toward the stopper element 1022**.

Figure 3:
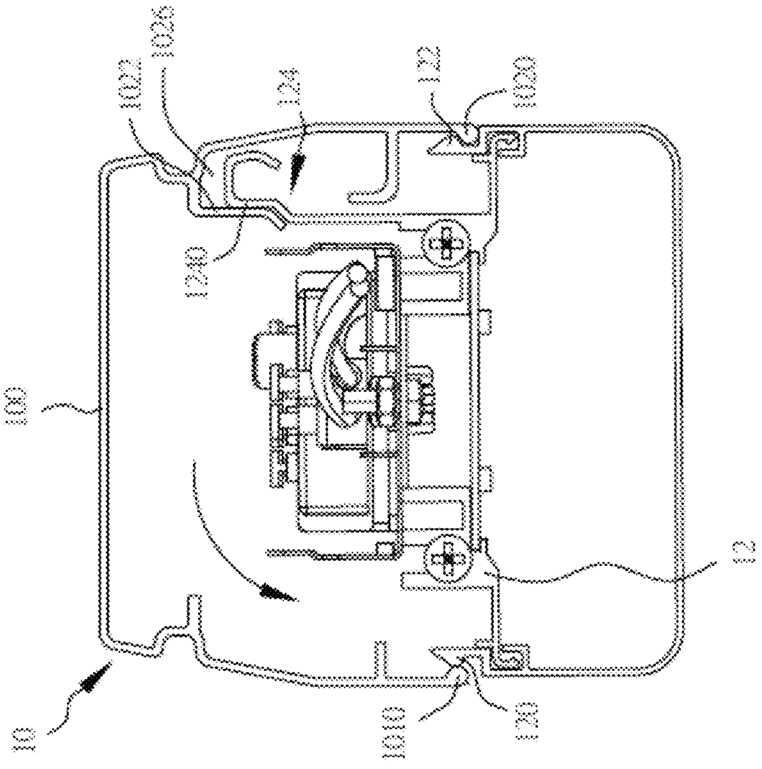
FIG. 3 is a schematic view illustrating a usage status of a first separated mode of the track lighting in accordance with the present invention.
Figure 4:
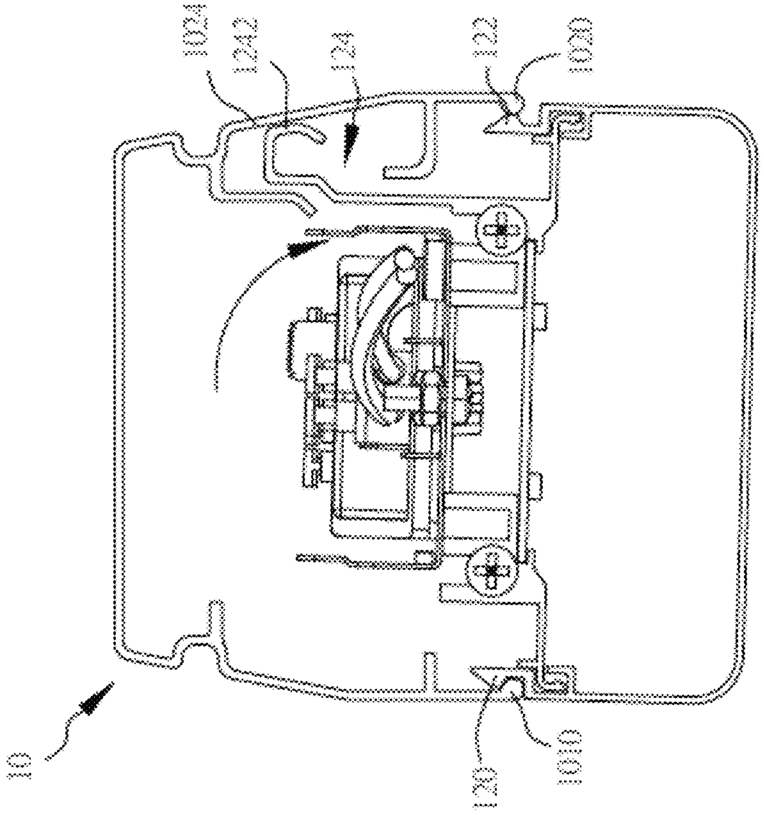
FIG. 4 is a schematic view illustrating a usage status of a second separated mode of the track lighting in accordance with the present invention.
Figure 5:
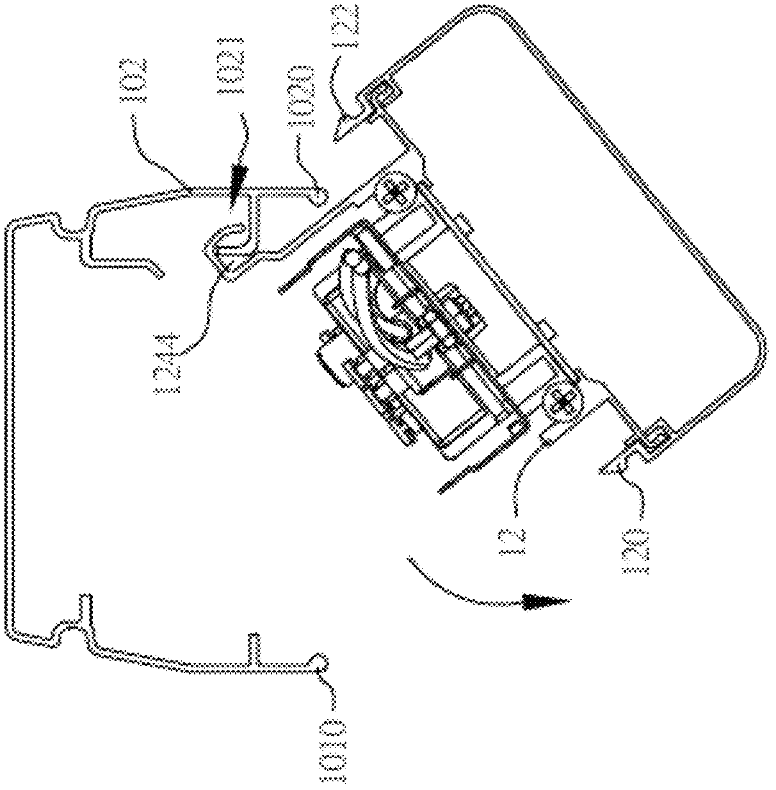
FIG. 5 is a schematic view illustrating a usage status of a third separated mode of the track lighting in accordance with the present invention.

Please refer to FIG. 3, FIG. 4 and FIG. 5, which are a schematic view illustrating a usage status of a first separated mode of the track lighting, a schematic view illustrating a usage status of a second separated mode of the track lighting and a schematic view illustrating a usage status of a third separated mode of the track lighting in accordance with the present invention respectively. When installing the track lighting 1, the user can fix the track structure 10 on the wall and then directly install the light source installation base 12 on the track structure 10. More specifically, when installing the light source installation base 12, the user can insert the stopper structure 124 extending from the second buckle portion 122 into the stopper space 1026. Then, the user engages the first locking portion 1010 and the second locking portion 1020 on the track structure 10 with the first locking portion 120 and the second locking portion 122 on the light source installation base 12. When the first locking portion 1010 at one side is separated from the first buckle portion 120, the light source installation base 12 tilts toward the direction of the first locking portion 1010 being separated from the first buckle portion 120 (the direction of the arrow is the tilting direction). Thus, the first aligning portion 1240 on the stopper structure 124 can press against the stopper element 1022 on the track structure 10. The structure design of the first aligning portion 1240 and the stopper element 1022 can prevent from the danger due to the track structure dropping off the light source installation base.

On the contrary, when the second locking portion 1020 on the track structure 10 is separated from the second buckle portion 122 on the light source installation base 12, the light source installation base 12 can tilt toward the direction of the second locking portion 1020 being separated from the second buckle portion 122 (the direction of the arrow is the tilting direction). Therefore, the second aligning portion 1242 on the stopper structure 124 can press against the stopper portion 1024 on the track structure 10. The structure design of the second aligning portion 1242 and the stopper portion 1024 can prevent from the danger due to the track structure dropping off the light source installation base.

It is worthy to point out that the hanging groove 1244 disposed on the stopper structure 124 of the light source installation base 12 can be corresponding to the hanging structure 1021, extending from the second locking portion 1020, of the second lateral wall 102. When the track structure 10 is completely separated from the light source installation base 12, the first locking portion 1010 and the second locking portion 1020 on the track structure 10 are not engaged with the first buckle portion 120 and the second buckle portion 122 on the light source installation base 12. In this case, the hanging groove 1244 can be hanged on the hanging structure 1021, extending from the second locking portion 1020, of the second lateral wall 102, which can effectively prevent from the danger due to the track structure dropping off the light source installation base.

It will be apparent to those skilled in the art that various modifications and variations can be made to the disclosed embodiments. It is intended that the specification and examples be considered as exemplary only, with a true scope of the present invention being indicated by the following claims and their equivalents.

What is claimed is:

1. A track lighting device, comprising:

a track structure comprising an installation base, a first lateral wall circuitously extending from one side of the installation base and a second lateral wall circuitously extending from another side of the installation base, wherein one end of the first lateral wall is provided with a first locking portion and one end of the second lateral wall is provided with a second locking portion, wherein there is a stopper element adjacent to the installation base and extending in a direction toward the second locking portion, and the second lateral wall is provided with a stopper portion and corresponding to the stopper element, wherein a stopper space is formed between the stopper element and the stopper portion;

a light source installation base comprising a first buckle portion and a second buckle portion disposed at two sides thereof respectively, wherein the first buckle portion is configured to be engaged with the first locking portion and the second buckle portion is configured to be engaged with the second locking portion, wherein a stopper structure extends from a position adjacent to the second buckle portion and is configured to be inserted into the stopper space, and the stopper structure comprises a first aligning portion corresponding to the stopper element and a second aligning portion corresponding to the stopper portion, wherein a hanging groove is formed between the first aligning portion and the second aligning portion; and a hanging structure extending from the second lateral wall above the second locking portion and configured to be engaged with the hanging groove, wherein the hanging structure comprises an extending wall extending from the second lateral wall in a horizontal direction and a hanging wall extending from the extending wall in a direction toward the stopper element;

wherein when the track structure is completely separated from the light source installation base, the first locking portion and the second locking portion on the track structure are not engaged with the first buckle portion and the second buckle portion on the light source installation base, and the hanging groove is hanged on the hanging structure extending above the second locking portion of the second lateral wall, whereby the light source installation base is tilted by a certain angle so as to prevent a danger due to the track structure dropping off the light source installation base, wherein a distal end of the stopper element is provided with a bending portion, and the first aligning portion further comprises a stopping portion corresponding to the bending portion, whereby a guiding effect is provided to make the stopper structure be limited in the stopper space.

2. The track lighting as claimed in claim 1, further comprising a light source module installed on the light source installation base.

* * * * *